Patented July 16, 1946

2,403,964

UNITED STATES PATENT OFFICE 2,403,964

SURFACE COATING FOR PACKAGING POLYMERS

John H. Bannon, Union, and Harvey N. Mims, Cranford, N. J., assignors to Standard Oil Development Company, a corporation of Delaware No Drawing. Application December 9, 1942, Serial No. 468,424

3 Claims. (Cl. 260—23)

This invention relates to a surface coating material to be applied to the inside of containers for shipping high molecular weight essentially hydrocarbon polymeric materials which are somewhat tacky in nature and undergo cold-flow, as a means of overcoming adherence of such materials to the containers.

It is known in the art that rubber-like polymers and interpolymers of an isoolefin and isoolefin-diolefin respectively, produced by low temperature polymerization are somewhat tacky in character and have a tendency to undergo relatively persistent deformation when the polymer or interpolymer is subjected to an applied stress at ordinary temperatures. The tendency of the polymeric material to undergo this deformation or cold-flow besets the packaging and shipping of the material with many inconveniences. When the materials are shipped in packages, considerable quantities of the hydrocarbon material usually, thus adhere to the walls of the shipping container. This is highly disadvantageous, since appreciable losses of valuable material occur and also the surface layers, in contact with the packaging material, become contaminated. In the case of the highly viscous tacky hydrocarbon polymers, considerable labor and material losses are incurred in endeavoring to remove such material from the sides of the container. A coating material has now been prepared for lining shipping containers so as to permit relatively easy separation of the hydrocarbon polymeric material from the container without substantial contamination of the surfaces.

It has now been found that for packaging materials, such as synthetic rubber, a highly satisfactory lining for shipping containers may be prepared by dissolving in a solvent, such as a light petroleum naphtha, between about 1% and 10% of any of the high molecular weight polymeric materials prepared by low temperature polymerization or copolymerization and adding to the solution thus formed a surface active material until a relatively uniform slurry is formed. The surface active materials employed in the formation of the slurry are materials light in weight and which have a pronounced tendency to concentrate at the surface. When such a composition is brushed or sprayed or applied by rollers on the inside of shipping containers so as to form a lining or coating therefor, the solvent readily evaporates, leaving on the surface a coating to which the hydrocarbon polymeric material does not readily adhere. When a coating is formed on the surface of the hydrocarbon polymer by contacting the surfaces so formed, it may usually be readily removed by scraping or wiping the surface. The coating may sometimes, however, be milled into the mass since the coating composition is without disadvantageous effect upon the polymeric material as a whole.

The class of hydrocarbon polymers which are particularly suitable for the preparation of an inner lining for shipping containers in accordance with the present invention are the solid substantially saturated long chain linear isobutylene polymers produced by the polymerization of isobutylene alone or admixed with an inert diluent, in the presence of a Friedel-Crafts type catalyst or boron fluoride dissolved in an alkyl halide at a temperature ranging from —50° to —80° and as low as —150° C. Polymerized isobutylene having a molecular weight of 20,000 or above is for example, sufficiently solid and rubberlike to permit its being used in many instances as a constituent of the compositions for lining shipping containers. Similarly interpolymers of an isoolefin and a diolefin as prepared in accordance with the steps as taught in Australian Patent 112,875 issued to R. M. Thomas and W. J. Sparks are effectively utilized for the purpose of the present invention.

The surface active materials employed in the preparation of the slurry include such substances as kieselguhr, infusorial earth, magnesium silicate, zinc stearate, whiting, magnesium carbonate, Kalite, lithophone, titanium pigment, French chalk, zinc oxide, zinc sulfide, "Celite" (diatomaceous earth material of silicious origin), clays, talc, and the various types of carbon black. These inert finely divided materials admixed with the polymeric material function to control and reduce the cohesive tendency of the material to be packaged from adhering to the container.

In preparing the lining or coating composition containing clay, carbon black or talc, it has been found particularly advantageous to incorporate in the composition also a wetting agent such as a petroleum sulfonate or naphthenate compound. The coating composition is also improved by incorporating in the mixture small percentages of a petroleum wax before the addition of the soap or talc or clay. The addition of wax to the basic composition imparts to the mass a greater facility for separation of the coating composition from the surface of the hydrocarbon material. Furthermore, with petroleum wax as an ingredient, the surface is usually less contaminated with the coating material. The use of a wetting agent in the composition containing wax is also highly advantageous.

It is usual also in preparing the various coating compositions to make as far as possible a good solution of the hydrocarbon polymer or interpolymer in the solvent, such as naphtha, petroleum ether, or other light hydrocarbon solvent and then to add the surface active material, such as clay, carbon black, or talc, in sufficient quantity to form a smooth feeling slurry. Sometimes the high molecular weight polymeric or interpolymeric material is mixed with the surface active material in the absence of a solvent. In this case the temperature of mixing is raised from about atmospheric to about 250° F. When wax is incorporated in the composition, the polymeric or interpolymeric material and the wax polymer are placed between cardboard surfaces 4" x 4" treated with the various coating compositions. The temperature of the polymeric material at the time of contact with the treated cardboard is 130° F. The "sandwich" of the hydrocarbon polymer between the layers of treated cardboard is then loaded with a weight equivalent to 0.4 lb. per square inch and is stored for periods, usually for 100 hours, at 110° F. The various specimens are then removed and examined for adhesion of the hydrocarbon polymer to the cardboard.

The following data have been obtained in testing various compositions according to the "sandwich" test upon a rubber-like material prepared by low temperature copolymerization of isobutylene with butadiene:

*Table I*

["Sandwich" tests in oven (4" x 4" specimens, 110° F., 0.4 lb./sq. in. load)]

| Coating formula in parts by weight | | | Observations |
|---|---|---|---|
| 1. FIRST SERIES (100 HOURS EXPOSURE) | | | |
| 1 hydrocarbon polymer | 10 naphtha | 2 zinc stearate | Separation easy; powdery, sticks preferentially to hydrocarbon polymer. |
| Do | do | 2 Dixie clay | Separation easy; very powdery, sticks preferentially to hydrocarbon polymer. |
| 0.2 hydrocarbon polymer—0.8 wax | do | 2 zinc stearate | Separation easy; coating split, half on stock, half in cardboard. |
| Do | do | 2 Dixie clay | Separation easy; powdery coating flakes rather than splits. |
| 1 wax-polymer [1] | do | 2 zinc stearate | Separation easy; coating split, half on stock, half on cardboard. |
| 2. SECOND SERIES (100 HOURS EXPOSURE) | | | |
| 0.2 hydrocarbon polymer—0.8 wax | 4 naphtha | 2 zinc stearate | Separation easy. Both surfaces of cardboard and stock evenly coated. |
| Do | do | 2 Dixie clay | Separation easy, very powdery. |
| Do | do | 4 Dixie clay—0.2 petroleum sulfonate soap | Separation easy, very slight tendency to powder, coating split nicely. |
| Do | 1 zinc stearate (melt) | | Separation easy, coating considerably more brittle than regular naphtha solution. Otherwise same as regular. |

[1] The hydrocarbon polymer in this case was formed by the low temperature polymerization of isobutylene alone and had a molecular weight of about 80,000.

are mixed together in the solvent and then, as previously, the surface active material is admixed to form the slurry. When a wetting agent is employed this compound is incorporated in the solution first formed; that is, before the formation of the slurry with the surface active material.

The suitability of various coating compositions prepared according to the invention for use in the lining of shipping containers for tacky hydrocarbon polymeric materials is indicated by a test which has been developed for this particular purpose. In this test sheets of the hydrocarbon Another manner of testing the suitability of the various compositions for satisfactorily lining shipping containers is the coating of small cardboard boxes 8" x 8" x 6" filled with the hydrocarbon polymeric material and then loading to simulate large box pressure. The boxes are then stored under such conditions for about a month at a temperature of between 110° F. and 120° F. According to this manner of testing, the various coating compositions displayed their behavior as shown in the following table:

*Table II*

| Coating formula | | | Observations |
|---|---|---|---|
| 0.2 hydrocarbon polymer—0.8 wax | 10 naphtha | 2 zinc stearate | Separated easily, no indication of sticking, coating flexible but not powdery. |
| Do | do | 2 Dixie clay | Separation not as easy as Zn stearate. Several small pieces of paper stuck to stock. Powdery. |
| Do | do | 1.5 zinc stearate, 0.5 Dixie clay | Separation easy, no apparent difference from the plain stearate. |
| Do | do | 0.5 zinc stearate, 1.5 Dixie clay | Separation about the same as all clay. Slightly better coating than plain clay. Powdery. |
| 0.1 hydrocarbon polymer—0.9 wax | do | 2 zinc stearate | Separation easy, not much different than 20% hydrocarbon polymer coating, slightly thinner coating. |
| Do | do | 2 Dixie clay | Separation slightly harder than 20% hydrocarbon polymer, clay difference in concentration of hydrocarbon polymer more noticeable with clay also more powdery. |
| Do | do | 1.5 zinc stearate, 0.5 Dixie clay | Separation easy, similar to all Zinc stearate pigmentation. |
| Do | do | 0.5 zinc stearate, 1.5 Dixie clay | Separation not as easy as stearate alone, slight tendency to stick in spots. Powdery. |
| 0.2 hydrocarbon polymer—0.8 wax | do | 3.5 Dixie clay | Separation very easy. Very powdery, loose flakes, when cardboard is stripped off. |

Comparison of data presented in Tables I and II indicate that the composition of the hydrocarbon polymeric material, wax, naphtha and zinc stearate is markedly superior, and therefore preferable to the composition formed without the incorporation of wax, especially as regards its resistance to flaking and powdering. Clay is shown to be less advantageous than zinc stearate as a surface active material in the composition. It is easily seen that the ratio of hydrocarbon polymer to wax in the combination of the hydrocarbon polymer-wax-zinc stearate admixture is not critical. Furthermore, it is seen that about 1 part of the hydrocarbon polymer to 4 parts of the petroleum wax is a particularly suitable mixture for advantageous results.

The hydrocarbon polymers used include an iso-olefin polymer such as poly-isobutylene or an interpolymer of an isoolefin with a diolefin or polyolefine such as butadiene, isoprene, piperylene; 2-methyl hexadiene-1,5; myrcene, hexatriene or any other polyolefin or homolog thereof, of 4 to 12 carbon atoms capable of interpolymerization with an isoolefin.

The invention has now been described and illustrated in certain preferred embodiments. The invention, however, is not limited thereby but is defined by the following claims or their equivalents.

What is claimed is:

1. An improved liquid coating composition for containers to prevent adherence thereto of tacky high molecular weight hydrocarbon polymers consisting essentially of 0.1 to 0.2 part by weight of a low temperature copolymer of an iso-mono-olefin and a diolefin, 0.8 to 0.9 part by weight of petroleum wax, 0.5 to 2 parts by weight of zinc stearate and 4 to 10 parts by weight of a light petroleum naphtha.

2. An improved liquid coating composition for containers to prevent adherence thereto of tacky high molecular weight hydrocarbon polymers consisting essentially of 0.2 part by weight of a low temperature copolymer of an iso-mono-olefin and a diolefin, 0.8 part by weight of petroleum wax, 2 parts by weight of zinc stearate and 10 parts by weight of a light petroleum naphtha.

3. An improved liquid coating composition for containers to prevent adherence thereto of tacky high molecular weight hydrocarbon polymers consisting essentially of 0.1 part by weight of a low temperature copolymer of an iso-mono-olefin and a diolefin, 0.9 part by weight of petroleum wax, 2 parts by weight of zinc stearate and 10 parts by weight of a light petroleum naphtha.

JOHN H. BANNON.
HARVEY N. MIMS.